M. P. R. TILTON.
Ventilated Pillows, Mattresses, &c.
No. 213,360.    Patented Mar. 18, 1879.
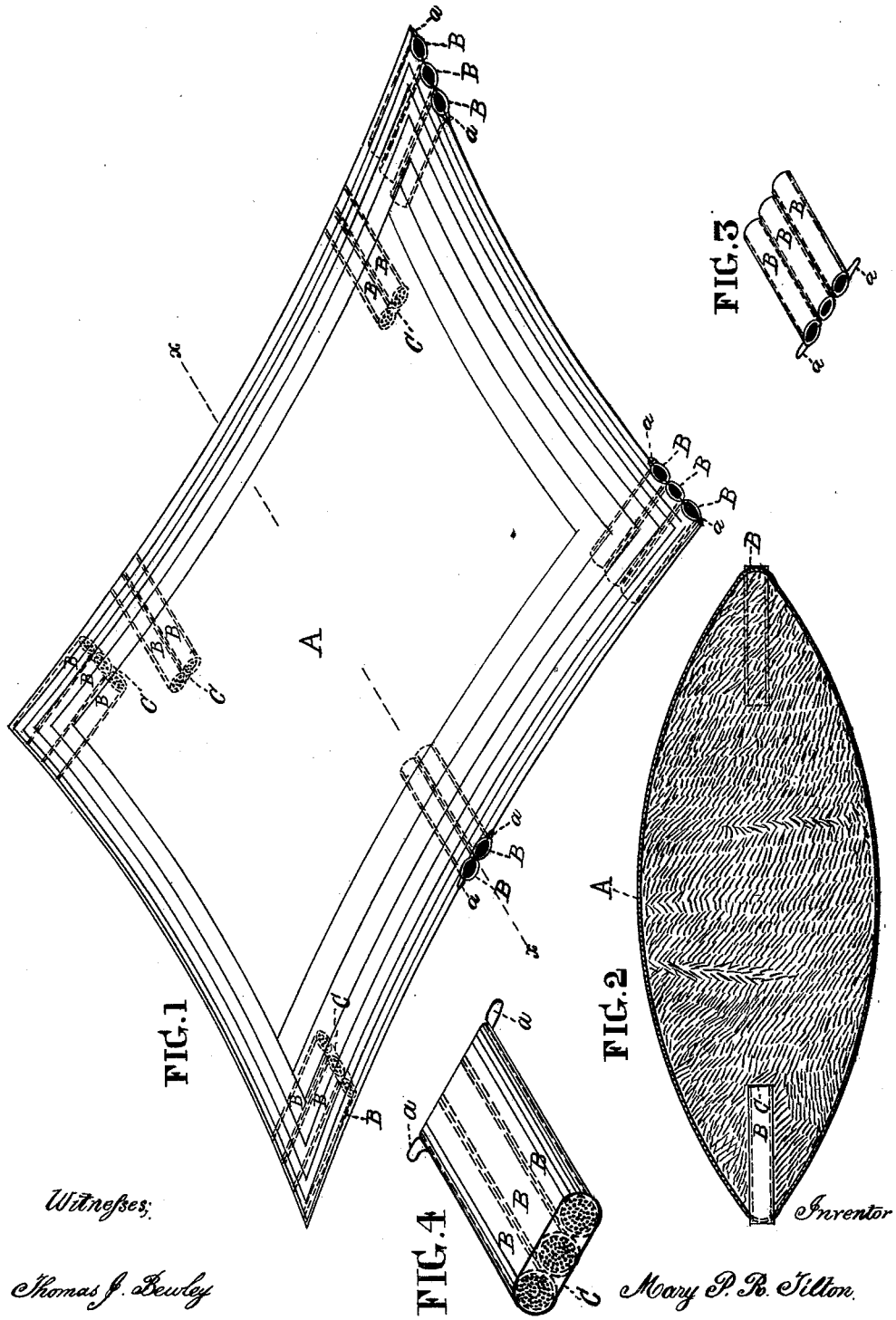

UNITED STATES PATENT OFFICE.

MARY P. R. TILTON, OF PHILADELPHIA, PENNSYLVANIA.

IMPROVEMENT IN VENTILATED PILLOWS, MATTRESSES, &c.

Specification forming part of Letters Patent No. 213,360, dated March 18, 1879; application filed October 5, 1878.

*To all whom it may concern:*

Be it known that I, Mrs. MARY P. R. TILTON, of the city and county of Philadelphia, in the State of Pennsylvania, have invented a new and useful Improvement in Ventilated Pillows, Mattresses, &c., and cushions of sofas, lounges, chairs, and other seats, of which the following is a specification:

The object of my invention is to give a continuous ventilation to the beds, pillows, mattresses, and cushions of sofas, lounges, chairs, and other seats, so as to prevent the accumulation of confined or impure air, which has hitherto been a source of great injury to health and comfort. The object is, also, to increase the elasticity of such articles; and the nature of the invention consists in the combination of short metallic or other tubes with the edges or the flat surfaces of the beds, &c., for the ingress of fresh or pure air to the interior thereof, and the egress of impure air therefrom, the inner ends of the tubes being provided with wire-gauze or perforated metallic plates, which admit the free passage of air through the tubes, but prevent their being filled or choked up with feathers or other fillings of the beds, &c. In practice I have found that the tubes without such protection soon become unfit for the object for which they are intended.

In the accompanying drawings, Figure 1 is a perspective view of a bed with my improvement. Fig. 2 is a cross-section at the line $x\,x$ of Fig. 1. Fig. 3 is a perspective view of an assemblage of air-tubes, B. Fig. 4 is a perspective view of a series of three tubes, B, provided with a perforated metallic plate, C.

Like letters of reference in all the figures indicate the same parts.

A represents a bed having my improvement for ventilation. It is made in the usual manner, with the exception of having suitable openings in the edges for the connection of tubes B, which I make in assemblages, as shown in Figs. 1 and 3, in which the tubes are joined together, or are single, and connect them with the bed, as shown in Figs. 1 and 2.

The tubes have a clip, $a$, at one end, which is bent inward into connection with the bed, as represented.

When three or more tubes are used in connection, the outer tubes only need be provided with the clips. They are prevented slipping outward by stitching, as represented.

Turned annular edges may take the place of the clips, if desired; or any other device may be used for connecting the tubes with the article.

I usually arrange an assemblage of the tubes at each corner of the bed or other article to be ventilated, as represented in Fig. 1, and the intermediate ones any desirable distance apart.

The intermediate tubes at one edge may be arranged in line, respectively, with the like tubes at the opposite edge, or out of line, as shown in Fig. 1, as may be desired.

I make the tubes of sheet metal, or any other suitable material.

To prevent the tubes being choked, so as to prevent the free passage of air, I cover their inner ends with metallic perforated plates C, as shown in Fig. 4; otherwise they would soon be so filled with feathers or other filling of the beds, &c., as to obstruct the passage of air through them.

I have represented the improvement in connection with a bed as an example, but intend it for bolsters, pillows, hair or other mattresses, and all cushioned seats, such as sofas, lounges, chairs, &c., in which the tubes should be arranged as described, or in any other suitable or convenient manner.

The tubes are represented in the drawings in connection with the edges of a bed; but with some other articles it may answer the purpose better to connect them with one or both sides.

It will readily appear that by the use of my improvement beds, &c., are not only thoroughly ventilated, but that the filling in of the air with the feathers or other filling material will greatly increase the elasticity of the article, and also preserve the feathers.

I claim as my invention—

As a new article of manufacture, the herein-described cushion for mattresses and articles of furniture, having the tubes B inserted in the edges thereof, the inner end of the tubes being covered with wire-gauze or perforated plates, substantially as shown and described.

MARY P. R. TILTON.

Witnesses:
THOMAS J. BEWLEY,
STEPHEN USTICK.